(12) United States Patent
Chu et al.

(10) Patent No.: US 6,479,575 B1
(45) Date of Patent: Nov. 12, 2002

(54) ELECTRICAL DEVICES COMPRISING CONDUCTIVE POLYMER BLEND COMPOSITIONS

(75) Inventors: Fu-Hua Chu, Taipei; Yun-Ching Ma, Jun-Ho, both of (TW)

(73) Assignee: Polytronics Technology Corporation, Hsinchu (TW)

( * ) Notice: Subject to any disclaimer, the term of this patent is extended or adjusted under 35 U.S.C. 154(b) by 0 days.

(21) Appl. No.: 09/294,543

(22) Filed: Apr. 19, 1999

(51) Int. Cl.[7] .................................................. C08K 3/04
(52) U.S. Cl. ....................................... 524/495; 252/511
(58) Field of Search ............................. 524/44 S, 538; 525/232, 240

(56) References Cited

U.S. PATENT DOCUMENTS

| | | | | | |
|---|---|---|---|---|---|
| 4,466,912 A | * | 8/1984 | Phillips | ..................... | 252/512 |
| 4,478,903 A | * | 10/1984 | Kishida | ..................... | 428/216 |
| 4,508,640 A | * | 4/1985 | Kanda | ..................... | 252/503 |
| 4,560,524 A | * | 12/1985 | Smuckler | ..................... | 264/105 |
| 4,921,648 A | * | 5/1990 | Soni | ..................... | 264/27 |
| 5,534,582 A | * | 7/1996 | Krause | ..................... | 524/441 |
| 5,552,199 A | * | 9/1996 | Blong | ..................... | 428/36.9 |

* cited by examiner

*Primary Examiner*—Paul R. Michl
(74) *Attorney, Agent, or Firm*—Heller Ehrman White & McAuliffe LLP

(57) ABSTRACT

Conductive polymer blend composites exhibiting PTC (positive temperature coefficient of resistance) behavior, comprising at least two types of polymers and preferably at least two types of conductive particulate materials (e.g., carbon blacks), and electrical devices containing such composites. The two polymers are selected to have different melt flow index values, while the two particulate materials are selected to have different average particle sizes and DBP values.

6 Claims, 1 Drawing Sheet

ELECTRICAL DEVICES COMPRISING CONDUCTIVE POLYMER BLEND COMPOSITIONS

BACKGROUND OF THE INVENTION

1. Field of the Invention

This invention in general relates to positive temperature coefficient of resistance (PTC) conductive polymer compositions and electrical devices containing such compositions, and, more particularly, to PTC conductive polymer blend compositions comprising at least two types of polymers and preferably at least two types of carbon blacks, and to electrical devices containing such compositions.

2. Description of the Prior Art

It is well-known that polymers can be made electrically conductive by dispersing therein suitable amounts of conductive particulate fillers such as carbon black or fine metal particles. Some of the conductive polymers exhibit PTC (positive temperature coefficient of resistance) behavior, and have been used in various electrical devices such as resettable circuit protection devices, self-regulatory heaters, and temperature and current sensors. Simply speaking, a PTC conductive polymer composition is characterized by its behavior that upon approaching a critical temperature (i.e., the switching temperature or Ts), a sudden increase in resistance takes place and, as a result, the current flow through the polymer is greatly reduced.

For a number of reasons, PTC conductive polymers have been gradually replacing conventional ceramic based PTC materials, e.g., $BaTiO_3$-doped ceramic thermistors, in many applications. First, conductive polymer composites can be made such that their resistivity is much less than 7; ohm-cm, and sometimes as low as 1 ohm-cm, which is approximately one order of magnitude lower than that of ceramics. This means that for the same electrical device dimensions the resistance is approximately ten times smaller. This low-resistance feature allows a higher hold current (i.e., larger steady-state running current) to pass though the electrical device without causing the device to heat up and latch or "trip" into the high-resistance state. Second, PTC polymers generally have better manufacturability than ceramics. Conventional thermoplastic processing methods such as melt mixing, extrusion, injection molding, continuous lamination, and spin-coating can all be used for preparing conductive polymer composites.

Although superior to ceramic PTC materials in many respects, prior-art PTC conductive polymer materials do have a number of disadvantages. The first of such disadvantages is that PTC conductive polymer composites generally exhibit the so-called resistance hysteresis effect, i.e., their resistance after heating or tripping does not immediately return to the initial value upon cooling, resulting in elevated power dissipation after resetting. This feature can have a severe negative effect on an electrical device (e.g., a resettable fuse) containing such composites if the device is to form part of a matched resistance circuit.

One of the approaches in the prior art to minimize the resistance hysteresis effect is to use a mixture of carbon blacks differing in their particle sizes. For example, U.S. Pat. No. 5,705,555, entitled "Conductive Polymer Compositions," discloses a conductive polymer composition comprising a mixture of two types of carbon blacks, each of which constitutes from 1 to 40 percent by weight of the composition and has a structure level (or pore volume), as measured by the DBP absorption technique, of 40 to 150 cc/100 g. The two types of carbon blacks differ only in their average particle sizes, i.e., one of them has an average size in the range from 35 to 300 nm and the other has an average size in the range from 15 to 25 nm.

Another approach in the prior art to reduce the resistance hysteresis effect and improve resistance stability is to use a blend of two polymers with different melting points. For example, U.S. Pat. No. 5,451,919, entitled "Electrical Device Comprising a Conductive Polymer Composition," discloses a PTC conductive polymer composition comprising two crystalline fluorinated polymers the melting points of which differ by 25° to 100° C.

Still another prior-art practice of making an electrical device containing a cross-linked PTC tip conductive polymer composition is taught in U.S. Pat. No. 4,560,498, entitled, "Positive Temperature Coefficient of Resistance Compositions," which includes the use of a first polymeric material exhibiting high green strength prior to cross-linking and elastomeric behavior after cross-linking, and a second polymeric material comprising a thermoplastic, both of such polymeric materials having dispersed therein conductive particles such as carbon black.

Yet another prior-art practice of making an electrical device containing a PTC element, as taught in U.S. Pat. No. 5,554,679, entitled "PTC Conductive Polymer Compositions Containing High Molecular Weight Polymer Materials," is to use a melt-extrudable polyolefin matrix, in which a volume-expansion-regulating, high-molecular-weight polymer and a conductive particulate filler are dispersed. Additionally, the volume-expansion-regulating polymer should have minimal migration upon heating of the composition and should not exceed 50% by weight of the total polymeric portion such that interference with the extrudability of the polyolefin matrix would not occur.

A second disadvantage of PTC conductive polymer composites is that, to make PTC materials having a sufficiently low resistivity, the conductive filler content generally has to be greater than approximately 35 volume percent. Such high filler loading generally results in elevated viscosities, causing various processing difficulties during the preparation of the devices using the polymer, particularly during melt extrusion of conductive polymer sheets and lamination of metal electrodes onto the conductive polymer substrate. High filler loading may reduce the bonding strength between an electrode and the conductive polymer, which in turn would cause foil delamination and high contact resistance after the exposure of the device to high ambient temperatures.

To alleviate the aforesaid contact resistance problem associated with poor bonding, most prior-art practices involve the use of a specially treated or roughened surface to improve its adhesion to the conductive polymer. Typically, such specially treated surfaces have a center-line average roughness Ra of at least 1.3 as measured by using a profilometer with a stylus of 5 μm radius. Alternatively, special processing schemes have been utilized. For example, U.S. Pat. No. 4,876,440, entitled "Electrical Devices Comprising Conductive Polymer Compositions," teaches the formation of an electrode-to-polymer interface by contacting the molten polymer composition with the electrode while the electrode is at a temperature above the melting point of the polymer composition.

SUMMARY OF THE INVENTION

It is therefore an object of the present invention to provide a PTC conductive polymer composition having a reduced resistance hysteresis.

It is another object of the present invention to provide an electrical device comprising electrodes and a PTC conductive polymer composite, which device has reduced contact resistance between the electrodes and the polymer composite.

It is yet another object of the present invention to provide a PTC conductive polymer blend composite comprising two or more types of polymers which can be selected based on an easily ascertainable physical, functional or dynamic property of the polymers.

It is a further object of the present invention to provide a PTC conductive polymer composite air containing two or more types of conductive particulate materials (e.g., carbon blacks) which can be selected based on easily ascertainable physical, functional, dynamic or kinetic properties of the materials.

Briefly, according to one aspect of the present invention, the composition of a conductive polymer blend composite suitable for use in electrical devices requiring the PTC characteristic can be predetermined by selecting two polymeric materials, each having a melt flow index (MFI) different from the other. These two polymer materials can have either similar or dissimilar molecular structures. As used herein, polymers having similar molecular structures, such as two types of high-density polyethylene (HDPE), are homologous polymers, whereas polymers having dissimilar molecular structures, such as a polyethylene and a copolymer of ethylene and vinyl acetate, are nonhomologous polymers.

Preferably, the composite of the present invention further comprises two types of conductive particulate materials, each having an average size and a DBP value different from the other.

In a PTC conductive polymer blend composite of the present invention, in case the two polymeric materials are homologous, one of the polymeric materials should have an MFT value approximately 3 to 15 and constitute approximately 5 to 45 percent by weight of the composite, while the other polymeric material should have an MFI value less than approximately 1 and constitute approximately 2 to 40 percent by weight of the composite; alternatively, in case the two polymeric materials are nonhomologous, one of the polymeric materials should have an MFI value of approximately 5 to 15 and constitute approximately 5 to 45 percent by weight of the composite, while the other polymeric material should have an MFI value less than approximately 1 and constitute approximately 2 to 40 percent by weight of the composite. In either case, if two types of conductive particulate materials are used, one of them should have an average particle size of approximately 60 to 120 nm and a DBP value of approximately 60 to 200 cc/100 g and should constitute approximately 45 to 56 percent by weight of the composite, while the other conductive particulate material should have an average particle size of approximately 10 to 20 nm and a DBP value of approximately 250 to 500 cc/100 g and should constitute approximately 2 to 10 percent by weight of the composite. It is understood that the total percentages of all the constituents or components of any composite above do not exceed 100 percent.

In another aspect the present invention provides a conductive polymer blend composition which exhibits PTC behavior; and comprises two crystalline, homologous polymeric materials, one of which has an MFI value of approximately 3 to 15 and constitutes approximately 5 to 45 percent by weight of the composition, while the other of which has an MFI value less than approximately 1 and constitutes approximately 2 to 40 percent by weight of the composition; and, preferably, comprises two types of carbon blacks, one of which has an average particle size of approximately 60 to 120 nm and a DBP value of approximately 60 to 200 cc/100 g and constitutes approximately between 45 and 56 percent by weight of the composition, while the other has an average particle size of approximately 10 to 20 nm and a DBP value of approximately 250 to 500 cc /100 g and constitutes approximately 2 to 10 percent by weight of the composition.

Alternatively, if the two polymeric materials of the above instance are nonhomologous in structure, then one of them should have an MFI value of approximately 5 to 1.5 and constitute approximately 5 to 45 percent by weight of the composition, while the other should have an MFI value less than approximately 1 and constitute approximately 2 to 40 percent by weight of the composition.

It is again understood that the total percentages of all the above constituents in (2) and (3) do not exceed 100 percent in each case.

In a further aspect the present invention provides an electrical device:
(1) comprising a conductive polymer composite which:
   (a) exhibits PTC behavior;
   (b) includes two crystalline polymeric materials, one of which has an MFI value of approximately 3 to 15 and constitutes approximately 5 to 45 percent by weight of the composite, while the other of which has an MFI value less than approximately 1 and constitutes approximately 2 to 40 percent by weight of the composite; and, preferably,
   (c) comprises two types of carbon blacks, one of which has an average particle size of approximately 60 to 120 nm and a DBP value of approximately 60 to 200 cc/100 g and constitutes approximately 45 to 56 percent by weight of the composite, while the other has an average particle size of approximately 10 to 20 nm and a DBP value approximately 250 to 500 cc /100 g and constitutes approximately 2 to 10 percent by weight of the composite; it is understood that the total percentages of all the above constituents in (b) and (c) do not exceed 100 percent; and
(2) comprising two metal electrodes each of which:
   (a) is at least 0.025 mm thick; and
   (b) is in ohmic contact with said polymer composite and can be connected to an electrical power source to cause current to flow through said polymer composite.

Alternatively, if the two polymeric materials of (1)(b) above are homologous, then one of them should have an MFI value approximately 5 to 15 and constitute approximately 5 to 45 percent by weight of the composition, while the other should have an MFI value less than approximately 1 and constitute approximately 2 to 40 percent by weight of the composition.

An advantage of the present invention is that the resistivity of an electrical device comprising the conductive polymer blend composition of the present invention has a resistivity significantly lower than conventional ceramic-based thermistors.

Another advantage of the present invention is that an electrical device comprising the conductive polymer blend composition of the present invention has a greatly reduced post-resetting power dissipation.

A further advantage of the present invention is that an electrical device comprising the conductive polymer blend composition of the present invention can be easily manufactured.

Still another advantage of the present invention is that an electrical device having enhanced bonding strength between its electrodes and conductive polymer blend composite can be easily manufactured.

These and other objects, features and advantages of the present invention will become apparent to those skilled in the art after reading the following detailed description of the preferred embodiments which are illustrated in the several figures of the attached drawings.

IN THE DRAWINGS

DETAILED DESCRIPTION OF THE INVENTION

Figure 1:
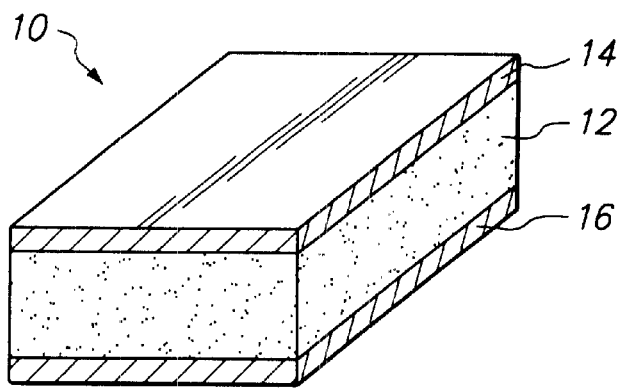
FIG. 1 is a cross-sectional representation of an electrical device of the present invention comprising a PTC conductive polymer composite and two electrodes.

While many compositions and embodiments in accordance with the present invention should be apparent from the description below, details of several preferred embodiments and specific examples are shown below to facilitate consideration of the present invention, with the understanding that the present disclosure is not intended to limit the invention to the embodiments or examples illustrated.

According to one aspect of the present invention, a conductive polymer blend composite with superior PTC characteristic can be made by using at least two polymeric materials, each having a melt flow index (MFI) different from the other. The MFI values of the polymeric materials are typically determined in their unfilled state by a melt flowometer in accordance with ASTM D-1238. Specifically in the present invention, the melt flow index of a polymeric material is measured as the weight of the polymeric material excluded in 10 minutes (i.e., g/10 min.) at a constant temperature (190° C.) through a tubular die having a diameter of 2.2 mm when a weight of 2160 g is placed on the driving piston (i.e., under Condition "190/2.16"). In comparison to the conventional practice, which generally uses melting point as the index for selecting suitable polymeric materials, the present invention uses MFI as the index for selecting suitable polymeric materials to be included in the PTC polymer blend.

Preferably, the above polymer blend composite further includes at least two types of conductive particulate material, each having an average particle size and a DBP value different from the other. Such a polymer blend composite is prepared by dispersing the particulate material in the polymer blend according to well-known techniques. The DBP absorption is typically measured in accordance with ASTM D-2414, and the average particle size of the conductive fillers is typically determined in accordance with ASTM D-3849.

Preferably, the aforesaid polymeric blend includes at least two crystalline polymeric materials such as two types of HDPE. Other suitable crystalline polymers include, without limitation, polymers of one or more olefins such as low-density polyethylene, linear low-density polyethylene, and copolymers of ethylene/vinyl acetate, ethylene/maleic anhydride and ethylene/glycidyl methacrylate. In the present invention, the two or more polymeric materials may be homologous; alternatively, two or more nonhomologous polymeric materials may also be used.

Notably, when comparing two homologous polymeric materials, e.g., two types of HDPEs, the higher the value of MFI, the lower the molecular weight, and the higher the flow mobility under a given applied force during processing (e.g., melt extrusion). Significantly, when nonhomologous polymeric materials are compared (e.g., HDPE vs. low-density polyethylene (LDPE) vs. linear low-density polyethylene (LLDPE)), MFI can still be used as an index for selecting suitable polymer materials, while conventional indexes such as melting point may not be indicative.

In a specific embodiment of the present invention, if the two types of polymeric components of the polymer blend are homologous, one of them should have a relatively high MFI value between 3 and 15; if the two types of polymeric components of the blend composition are nonhomologous, one of them should have a relative high MFI value between 5 and 15. In either case, it is conceivable that the component having the relatively high MFI value has a greater tendency to diffuse into the micro-cavities of the electrode surfaces, resulting in better microscopic interlocking.

In the above specific embodiment of the present invention, the polymeric material having the relatively high MFI value of approximately 3 to 15 (for homologous polymer materials) or approximately 5 to 15 (for nonhomologous polymer materials) should constitute approximately 5 to 45 percent by weight of the composition, while the other polymeric material has an MFI value less than approximately 1 and constitute approximately 2 to 40 percent by weight of the composition.

It is preferable to use more than one type of conductive particulate materials in the composition. Each particulate material should have both an average particle size and a DBP value that are different from those of the other particulate materials. Preferably, the conductive particulate materials are carbon blacks. Conventionally, to achieve a resistivity of less than 1 ohm-cm, a carbon black having an average particle size greater than about 60 nm and a DBP number greater than about 60 cc/100 g is used. However, compositions containing such a relatively large carbon black particulate material generally exhibit an appreciable resistance hysteresis effect. In contrast, in a preferred embodiment, the present invention teaches a conductive polymer composition containing more than at least two types of carbon blacks that differ from each other not only in their particle sizes but also in their DBP values. It has been discovered that the resulting conductive polymer composition will exhibit not only low initial resistivity (1 ohm-cm or less) and strong PTC characteristics but also a reduced resistance hysteresis effect.

In a specific embodiment of the present invention, a PTC conductive polymer blend composition comprises two types of carbon blacks, one of which has an average size approximately 60 to 120 nm and a DBP value approximately between 60 to 200 cc/100 g and constitutes approximately 45 to 56 percent by weight of the composition, while the other has an average size approximately 10 to 20 nm and a DBP value approximately 250 to 500 cc /100 g and constitutes approximately 2 to 10 percent by weight of the composition.

It is understood that, in the above preferred embodiments, the total percentages of all the components of the composite do not exceed 100 percent in each case.

EXAMPLES

To further illustrate various aspects of the present invention, the following selected examples are provided without any intention to limit the present invention thereto.

In Examples 1 to 8, two types of HDPE and three types of carbon black were used:

HDPE Type 1 is an injection molding grade, high density polyethylene resin (No. LH606) from Taiwan Union Resins Corp. It has a peak melting point of 131–132° C. as measured by differential scanning calorimetry (DSC) and a melt flow index of 6.0.

HDPE Type 2 is a blow molding grade, high density polyethylene resin (No. 8003) from Taiwan Synthetic Resins Corp. It has a peak melting point of 133–134° C. as measured by DSC and a melt flow index of 0.35.

Carbon Black Type 1 is the Black Pearl 110 beads available from Cabot Corp. It has an average particle size of about 60 nm and a DBP number of about 65 cc/100 g.

Carbon Black Type 2 is the Black Pearl 280 beads available from Cabot Corp. It has an average particle size of about 41 nm and a DBP number of about 121 cc/100 g.

Carbon Black Type 3 is the Black Pearl 2000 beads available form Cabot Corp. It has an average particle size of about 15 nm, and a DBP number of about 330 cc/100 g.

Typically, the samples in the selected examples were prepared in the following manner, with the amount given in percentages by weight of the total composition.

First, the ingredients, once selected based on their MFI values and average sizes and DBP values, respectively, were dry mixed in a plastic jar using a stir bar for 3 to 5 minutes, or until an uniform color was reached.

The dry-mixed ingredients were then mixed in a mixing chamber equipped with a mixer blade and maintained at a temperature of 200° C. An example of such a mixing chamber is the 50-ml Haake-600 mixing chamber made by Gebruder Haake GmbH, Karlsruhe, Germany. The mixer speed was initially set at 40 rpm during the introduction of the ingredients into the mixing chamber and then set at 70 rpm for 15 minutes. At the end of the 15-minute period, the molten composite was discharged onto a steel plate and allowed to cool down to room temperature.

The molten composite was then positioned between two Teflon-coated release sheets and transferred into a 150 mm×50 mm steel mold with an opening thickness of 0.33 mm. The steel mold was then transferred into a hot press comprising a heater, a top platen and a bottom platen. An example of such a hot press is the Model CM-70 manufactured by Tien-Fa Machinery Co., Taipei Hsien, Taiwan.

Next, conductive polymer sheets were made by a compression molding process essentially consisting of the following steps: Preheating the hot press for 5 minutes at a compression pressure between 600 and 700 psi; hot-pressing the polymer composite at a temperature of 180° C. and a compression pressure of 2000 psi for 5 minutes; and turning off the heater and introducing cooling water into both the top and the bottom platen to cool the entire steel mold. It typically took about 40 minutes to cool the steel mold to room temperature.

A compression-molded conductive polymer sheet was then introduced into an assembly, in which two sheets of metal electrodes were directly attached to both sides of the polymer sheet. These metal electrodes were 1-oz type electrodeposited nickel-plated copper foils each having a thickness of about 0.025 mm (available from Gould Electronics Inc., Eastlake, Ohio, USA). The Ra value of such foils was conveniently measured by using a profilometer having a stylus of 5 $\mu$m radius. As assembled, the polymer sheet was sandwiched sequentially between two sheets of metal foils, two Teflon-coated release sheets, two silicone rubber pads, two Teflon-coated release sheets, and two metal plates.

The aforesaid assembly was then transferred into the aforesaid hot press held at 180° C. The compression pressure was initially held at 40 psi for 30 seconds and then held at about 600 to 700 psi for 5 minutes. After the compression, the aforesaid water cooling process was conducted to cool the assembly to room temperature.

The conductive polymer laminate was then sheered into small chips, each about 10 mm×10 mm in size, for the electrical device assembly. The resistance of the chip was conveniently measured at room temperature by using a digital multimeter and a 4-wire measurement technique having a resolution of about $10^{-4}$ ohm. The resistivity $\rho$ was calculated by using the equation $\rho = R \times L/A$, where R is the measured chip resistance, A is the chip area, and L is the thickness of the conductive polymer sheet (excluding the metal foils).

To make a radial-leaded electrical device, a square chip was attached to two 1-in-long, 20-AWG, tin-coated copper leads from each side of the chip. The chip and the copper leads were immersed first in a flux bath, and then in a 63-Sn/37-Pb solder bath at 240° C. for 5 seconds. The device was then immersed in a deionized water bath to wash off flux residues.

The aforesaid radial-leaded device was then placed in a vacuum oven at 120° C. for 25 to 30 minutes. Afterwards, the device was taken out of the oven and allowed to cool down to room temperature. A typical PTC electrical device 10 is shown in FIG. 1 (leads not shown), where the PTC polymer chip 12 is "sandwiched" between two electrodes 14 and 16. Resistance of the device 10 was again measured at room temperature.

The resistance of the aforesaid annealed radial-leaded device 10 as a function of temperature was then determined by placing the device in an oven. While the temperature of the oven was ramped up from 25° C. to 150° C. and then back to 25° C. to complete one cycle, the device resistance was measured at 5 degrees intervals during the cycle using the aforesaid digital multimeter and 4-wire measurement technique.

The PTC resistance increase intensity (also known as "autotherm height" in the trade) of the aforesaid device 10 was determined by calculating the ratio of the resistance (or resistivity) at 140° C. to that at 30° C. Additionally, the resistance of the device was measured at least one hour after the device was heated from 25° C. to 150° C. and allowed to cool down to room temperature.

Experimental results and observations for Examples 1 to 8 are shown in Table I below:

TABLE I

| | EXAMPLE | | | | | | | |
|---|---|---|---|---|---|---|---|---|
| Component (Weight %) | 1 | 2 | 3 | 4 | 5 | 6 | 7 | 8 |
| HDPE Type 1 | 0 | 0 | 0 | 11 | 33 | 22 | 44 | 44 |
| HDPE Type 2 | 44 | 44 | 44 | 33 | 11 | 22 | 0 | 0 |
| Carbon Black Type 1 | 56 | 0 | 53.2 | 53.2 | 53.2 | 50.4 | 53.2 | 56 |
| Carbon Black Type 2 | 0 | 56 | 0 | 0 | 0 | 0 | 0 | 0 |
| Carbon Black Type 3 | 0 | 0 | 2.8 | 2.8 | 2.8 | 5.6 | 2.8 | 0 |

TABLE I-continued

| Component (Weight %) | EXAMPLE | | | | | | | |
|---|---|---|---|---|---|---|---|---|
| | 1 | 2 | 3 | 4 | 5 | 6 | 7 | 8 |
| ρ (initial chip) at 25° C. (ohm – cm) | .7 | .2 | .4 | .47 | .36 | .37 | .46 | .41 |
| ρ (device) at 25° C. (ohm – cm) | 1.1 | .93 | .52 | .71 | .52 | .5 | .66 | .59 |
| PTC Resistance Increase Intensity | $\geq 10^5$ | 253 | 545 | 576 | 931 | 225 | 1166 | $\geq 10^4$ |
| ρ (post-cycle)/ρ (device) | 1.38 | 1.32 | 1.12 | 1.16 | 1.14 | 1.18 | 1.18 | 1.19 |
| Delamination at electrode/polymer interfaces | Yes | Yes | Some | No | No | No | No | No |

A typical method for making PTC devices having been described above, a description of a scalable process suitable for manufacturing PTC electrical devices of the present invention in quantity will now be given.

Figure 2:
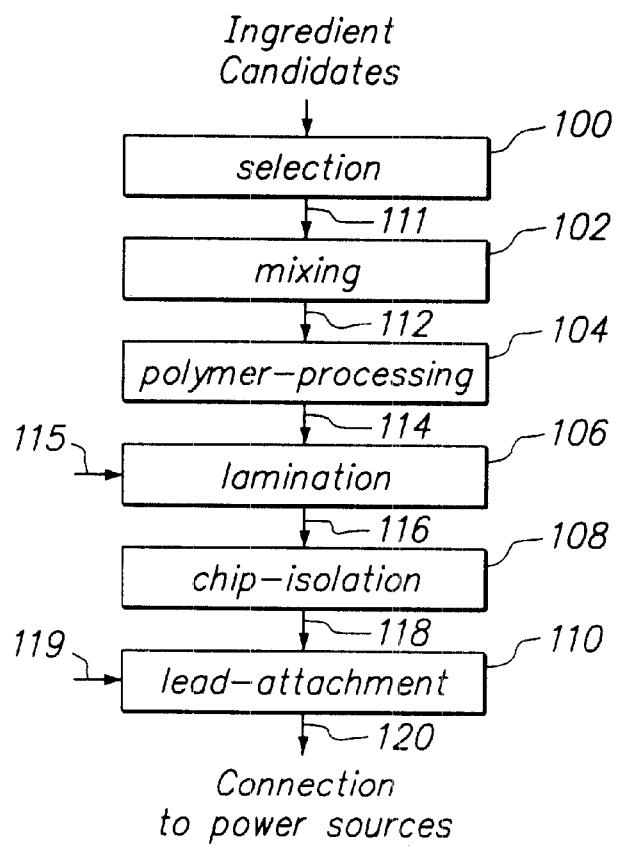
FIG. 2 is a flow chart showing the steps for manufacturing electrical devices of the present invention.

Referring to FIG. 2, amongst all ingredient candidates, the ingredients 111 of a conductive polymer blend composition, including the polymeric materials and the conductive particulate materials, are chosen in a selecting step 100 on the basis of the aforesaid criteria of MFI values (for the polymeric ingredients), average particle sizes and DBP values (for the conductive particulate ingredients), and weight percentages (for both polymeric ingredients and conductive particulate ingredients).

Next, the selected ingredients 111 of a conductive polymer blend composition are processed in a melt-mixing step 102 to form a molten conductive polymer blend 112.

The molten conductive polymer blend 112 is then processed in a polymer-processing step 104 to form a conductive polymer sheet 114. For mass production of the PTC electrical devices of the present invention, the polymer-processing step 104 is preferably a melt-extrusion step, which is well-known to those skilled in the art.

The conductive polymer sheet 114 and two conductive sheets (e.g., metal foils) 115 are then processed in a lamination step 106 to form a PTC conductive polymer/electrode composite 116.

The PTC conductive polymer/electrode composite 116 is then processed in a chip-isolation step 108 to form a plurality of PTC conductive polymer chips 118. Typically, the chip-isolation step 108 is a shearing, punching or die-sawing step.

Finally, the PTC conductive polymer chips 118 are each attached to external conductive leads 119 in a lead-attachment step 110 to form a plurality of PTC electrical devices 120 that can be connected to external power sources. The PTC electrical devices of the present invention can be driven by a wide range of electrical power sources, including low-voltage power sources having voltage settings of less than 10 VDC.

While the present invention has been particularly shown and described with reference to the above preferred embodiments and specific examples, it is to be understood by those skilled in the art that many other modifications and variations may be made thereto without departing from the broader spirit and scope of the invention as set forth in the claims. The specification and drawings are accordingly to be regarded as being illustrative, rather than being restrictive.

What is claimed is:

1. A conductive polymer blend composition exhibiting PTC behavior, comprising:

a first polymer having a melt flow index of 5.0 to 15.0 and constituting approximately 5 to 45 percent by weight of said composition;

a second polymer having a melt flow index less than 1.0 and constituting approximately 2 to 40 percent by weight of said composition; and at least one conductive particulate component.

2. The conductive polymer blend composition of claim 1, wherein said conductive particulate component comprises:

a first conductive particulate having an average particle size of approximately 60 to 120 nm and a DBP value of approximately 60 to 200 cc/100 g and constituting approximately 45 to 56 percent by weight of said composition; and a second conductive particulate having an average particle size of approximately 10 to 20 nm and a DBP value of approximately 250 to 500 cc/100 g and constituting approximately 2 to 10 percent by weight of said composition.

3. The conductive polymer blend composition of claim 2, wherein said first and said second conductive particulates are carbon blacks.

4. The conductive polymer blend composition of claim 3, wherein said first polymer and said second polymer are homologous crystalline polymers.

5. The conductive polymer blend composition of claim 4, wherein said first polymer and said second polymer are crystalline HDPE polymers.

6. The conductive polymer blend composition of claim 3, wherein said first polymer and said second polymer are nonhomologous crystalline polymers and said first polymer has a melt flow index of 5.0 to 15.0.

* * * * *